(No Model.)
W. A. LEECH & J. LITTLE.
ATTACHMENT FOR HARROWS.
No. 337,592. Patented Mar. 9, 1886.
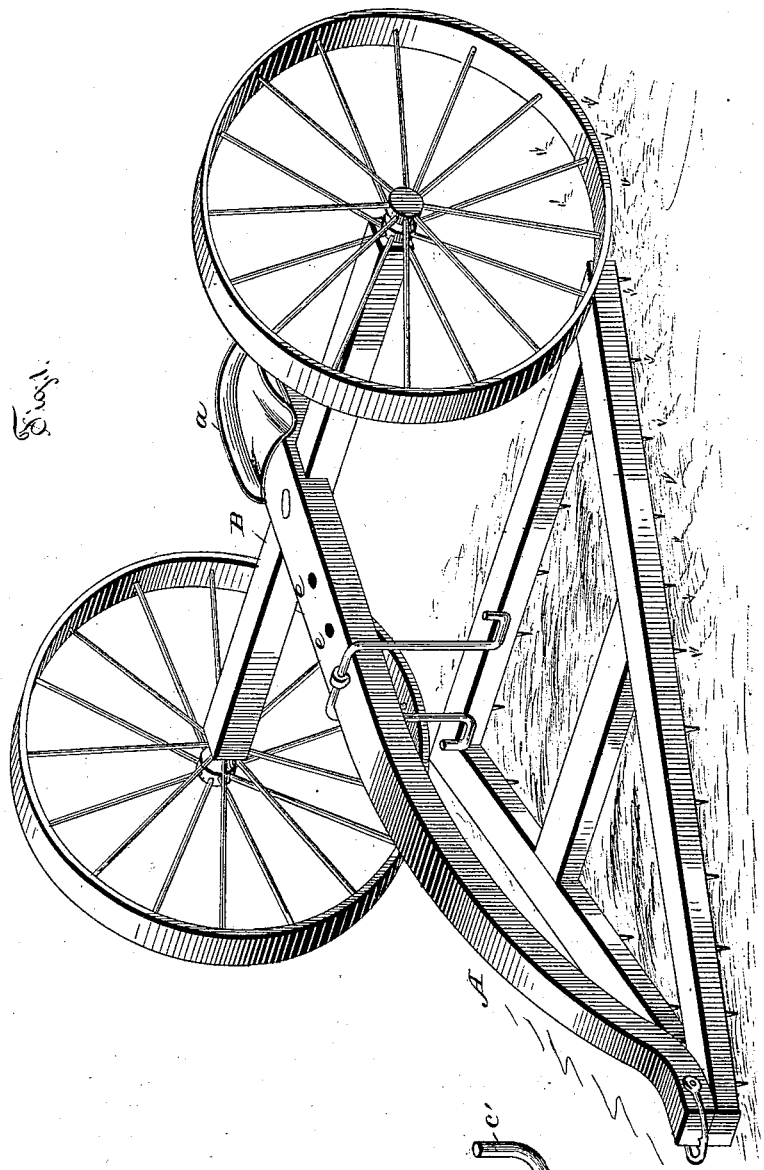
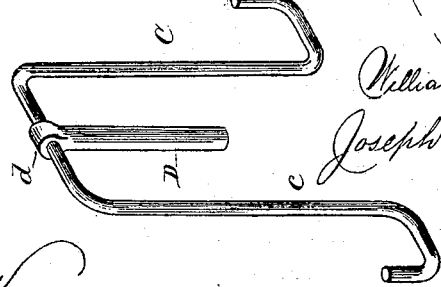
WITNESSES

UNITED STATES PATENT OFFICE.

WILLIAM A. LEECH AND JOSEPH LITTLE, OF LAMAR, MISSOURI.

ATTACHMENT FOR HARROWS.

SPECIFICATION forming part of Letters Patent No. 337,592, dated March 9, 1886.

Application filed January 21, 1886. Serial No. 189,302. (No model.)

*To all whom it may concern:*

Be it known that we, WILLIAM A. LEECH and JOSEPH LITTLE, citizens of the United States of America, residing at Lamar, in the county of Barton and State of Missouri, have invented certain new and useful Improvements in Attachments for Harrows; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to certain new and useful improvements in foot-rests for agricultural implements, the same being especially adapted to be applied to harrows, the object of the same being to provide an adjustable foot-rest, so that the same can be adjusted to suit drivers having different lengths of legs.

In the accompanying drawings, which illustrate our invention, Figure 1 is a perspective view of a harrow showing our improvement applied thereto, and Fig. 2 is a detail perspective view showing our improvement detached.

A refers to the tongue of a harrow carriage or support, the seat $a$ of which is located thereon in the usual manner, said tongue being supported directly from the axle B. The harrow C may be connected to said tongue and axle in any appropriate manner. The foot-rest C consists of a bar or bail, $c$, the terminal portions of which are bent outwardly and then upturned, as shown at $c'$, thus forming a horizontal projecting portion or stirrups, in which the driver may place his feet. The upper portion of the bail $c$ is also bent horizontally, and is adapted to lie above the upper portion of the tongue A, as shown in Fig. 1.

D refers to a pin, the upper end of which has formed thereon an eye, $d$, which embraces the upper horizontal portion of the bail, said pin being intended to be inserted in one of the perforations $e$ in the tongue, and will prevent longitudinal movement of the bail thereon, a lateral movement being prevented by the depending portions of the bail contacting with the vertical edges or sides of the tongue.

The tongue A is provided with a suitable number of vertical perforations, within which the pin D may be placed, so as to locate the bail nearer or farther away from the driver's seat. The bail and stirrups will have a slight swinging motion, so that the driver, after adjusting the foot-rest in the proper perforation in the tongue, may rest his feet in the stirrups so that his legs may be either straight from his body or bent at the knee-joint, and by use of this attachment it is unnecessary to provide an adjustable seat.

We claim—

1. In an agricultural implement, a tongue, A, having a series of perforations, $e$, a bail, C, having stirrups formed on its terminal portions, and a pin pivoted thereto and adapted to enter one of said perforations, substantially as shown, and for the purpose set forth.

2. As a new article of manufacture, a foot-rest made of a single bent bar, the ends of which are upturned to form stirrups or foot-rests, the upper center portion having a depending pin pivoted thereto, substantially as shown, and for the purpose set forth.

In testimony whereof we affix our signatures in presence of two witnesses.

WILLIAM A. LEECH.
JOSEPH LITTLE.

Witnesses:
W. C. SHAW,
A. H. WOOD.